March 19, 1957  E. B. GERARD  2,785,597
EXTREME CLOSE-UP FOCUSSING MECHANISM
Filed Nov. 13, 1956
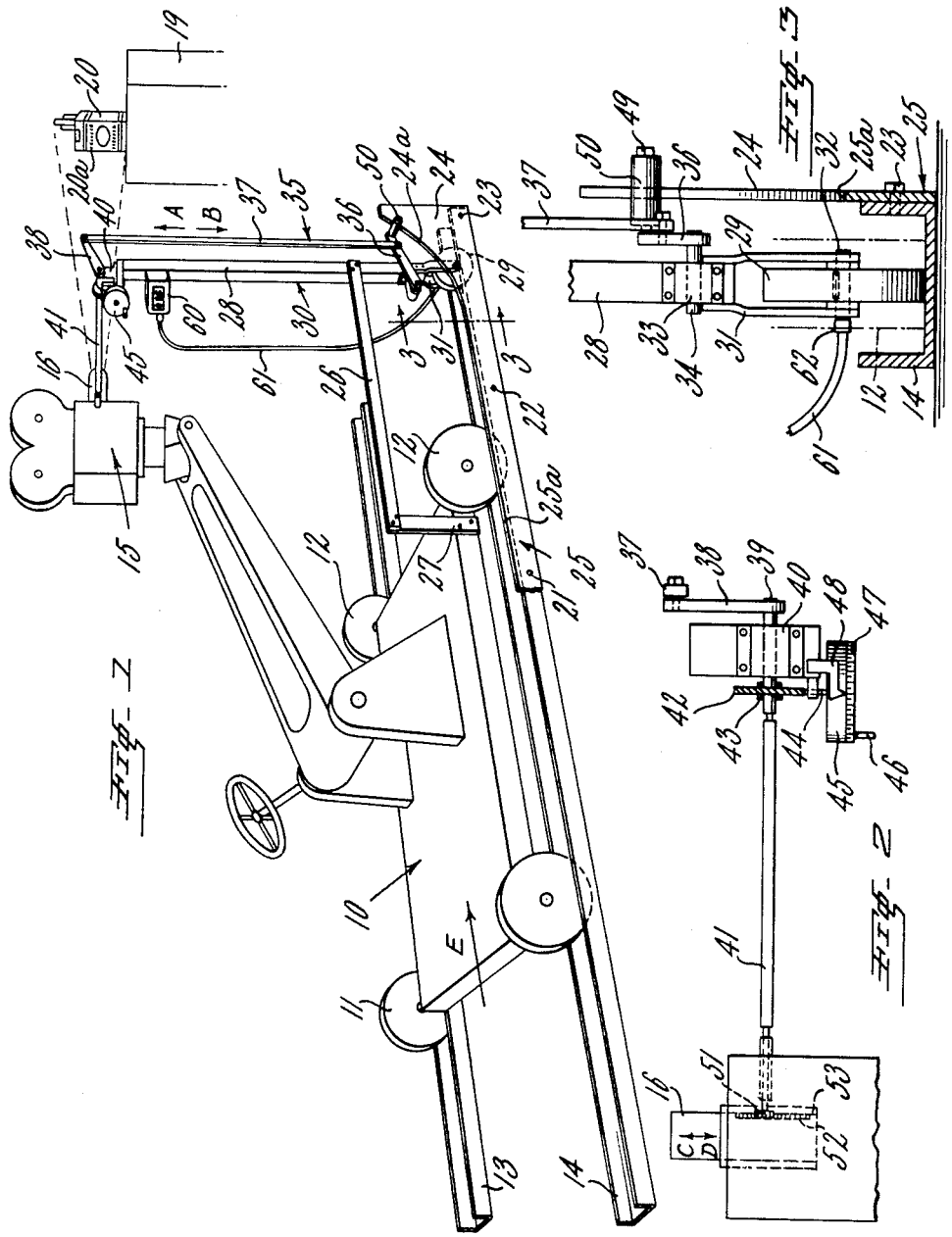
INVENTOR.
EDMUND B. GERARD
BY

United States Patent Office 2,785,597
Patented Mar. 19, 1957

2,785,597

EXTREME CLOSE-UP FOCUSSING MECHANISM

Edmund B. Gerard, Great Neck, N. Y.

Application November 13, 1956, Serial No. 621,920

8 Claims. (Cl. 88—16)

This invention concerns the automatic focusing of the taking lens of a motion picture camera, television recording and like apparatus.

It was heretofore the technique when taking pictures, in particular for advertising and educational films, to employ a dolly equipped with wheels running along a predetermined track or path, whereby the dolly is moved together with the camera mounted thereon toward the scene and finally for a close-up position relative to a particular object appearing in the scene.

During such movement of the dolly the operator was seated thereon and while looking through the camera viewer had to operate certain levers, hand wheels and the like to adjust the camera as to height, angular relation and distance with respect to the particular object in order to achieve a proper composition of the object relative to the scene in which it was placed. Besides the aforesaid manipulations, the camera had to be properly focused by hand while approaching the object. However, such focusing could not be had at a distance closer than three feet of the camera lens from the object. The camera operation had to be interrupted at the aforesaid distance and a new close-up lens had to be employed in order to take pictures of a closer range with respect to the scene and object.

Films of this type were generally made with great accuracy, but the time consumed and the gap necessarily caused in taking such pictures during these interrupted operational steps became very noticeable in the finished film and constituted a disturbing factor during reproduction and demonstration of such a film.

It is, therefore, the aim of the present invention to do away with the aforesaid and other deficiencies heretofore encountered in taking pictures of an object from a great distance to an extreme close-up position substantially automatically and without any interruptions whatsoever.

It is another object of the present invention to provide means ensuring a continuous take of motion pictures without regard to the speed with which a track-bound dolly with a camera mounted thereon approaches the object to be photographed.

It is a further object of the present invention to provide means affording a speedy transformation of any track-bound camera equipment of the aforesaid nature to a motion picture taking mechanism with automatic focusing means connected on the one hand with the track and on the other hand with the lens barrel, whereby heretofore constructed camera-equipped dollies can be readily changed without any difficulty to improved picture taking apparatus fulfilling all heretofore greatly desirable properties and requirements of the practice.

It is still a further object of the present invention to provide means necessitating only a relatively few operable parts which contribute to the taking of extreme close-up pictures of an object in a fully automatic manner, with great accuracy and without resorting to any manual readjustments or lens exchange for focusing the lens of the camera.

Still a further object of the present invention is to provide means redounding to an uninterrupted photographing or televising operation of an entire scene from an infinite camera position to a pin-pointing (extreme close-up) position relative to an object within said scene and without regard to the speed, with which pictures are to be taken.

Still another object of the present invention is to provide means ensuring efficacious operation of an automatically operated lens focusing mechanism which may be readily attached to existing camera equipment for cooperation with its track-bound dolly to thereby achieve the maintenance of a critical focus for the lens system of the motion picture camera throughout the movement of the latter by means of its supporting dolly to an extreme approach of the object, namely to a range of only a few inches.

Still a further object of the present invention is to provide means affording positive and precise focus adjustment of the camera lens in coordination with its speed of advance movement relative to the object to be photographed and in particular during extreme close-up operation of the camera.

These and other objects of the invention will become further apparent from the following detailed description, reference being made to the accompanying drawing, showing preferred embodiments of the invention.

In the drawing:

Fig. 1 shows diagrammatically and somewhat in perspective a track-bound dolly with a motion picture camera mounted thereon and equipped with a carriage provided with a motion transfer mechanism made in accordance with the invention for automatically focusing the lens of the motion picture camera.

Fig. 2 is a fragmentary and schematic showing of a part of said transfer mechanism of Fig. 1.

Fig. 3 is an enlarged sectional view taken along lines 3—3 of Fig. 1.

Referring now more particularly to the drawing, there is disclosed in Fig. 1 a dolly 10 having two pairs of wheels 11, 12 which are guided along a fixed track of U-shaped rails 13, 14. Dolly 10 carries in a conventional manner and for adjustment purposes relative to a scene to be photographed a motion picture camera 15 or like apparatus provided with a lens mount 16. As can be readily realized from Fig. 1 camera 15 can be tilted or paned in order to take photographic shots at an object 20 (such as a package of cigarettes) placed on a pedestal 19 within a scene (not shown). The object 20 bears a small inscription 20a which has to be photographed at an extremely close range by the camera lens, also known as an "extreme close-up." Lengthwise of track 14 there is arranged a cam-shaped guide bar 25 provided with an upwardly projecting guide piece 25a terminating in a curved extension 24 for a purpose hereinafter described. Bar 25 is fixed laterally to U-shaped rail 14 as at locations 21, 22 and 23 by means of screws or like fastening means. Curved cam extension 24 and guide bar 25 extend substantially perpendicularly to the ground on which track rails 13 and 14 are arranged.

On camera dolly 10 there is arranged support means having a frame 26 at 27, said frame being connected to a carriage 30 hereinafter described in greater detail. Carriage 30 includes an upright bar 28, which, in turn, is supported by a roll 29 rotatably held within a fork 31 and journaled about a pin 32.

Attached above fork 31 and pivotally carried in a bearing 33 is a pin 34 which through an operating arm 36 is linked to a motion transfer mechanism 35, hereinafter more clearly explained. This motion transfer mechanism 35 includes lens focusing adjustment means later referred to and operable means consisting of a rod 37 attached to a crank 38 which is fixedly connected to shaft 39 supported in bearing 40. Shaft 39 is operatively connected with a flexible shaft 41. Further seated on shaft 39 is a helical pinion 42 which is in mesh with a helical gear 43 operated by a shaft 44 extending from hand wheel 45.

Arm or lever 36 carries on its free end a cam follower 50, the latter being secured to a pin 49. Hand wheel 45 is provided with a scale 47 with which cooperates a pointer 48 attached to said bearing 40.

As can be seen from Fig. 2 flexible shaft 41 is operatively connected with lens focusing adjustment means consisting of a pinion 51 which cooperates with a rack 52 connected to the barrel 53 of the lens mount 16 for imparting movements to the barrel 53 for focusing purposes of the lens (not shown).

From the aforesaid disclosure it will readily become apparent that upon up or downward movement of rod 37 in the direction of arrow A or B shaft 39 will be rotated in its bearing 40, whereby this rotational movement is transmitted through flexible shaft 41 onto pinion 51 for linear movement of the lens mount in a direction C or D depending upon the direction of rotation of shaft 41.

The operation of the carriage 30 is briefly as follows:

When the camera dolly 10 is moved in the direction of arrow E from a station quite remote from the object 20 and along track 13 and 14 picture shots can be taken by the operator with the viewfinder directed towards the object and the scene in which the object appears. As the dolly approaches the object 20, cam follower 50 which was previously engaged on top guide piece 25a of guide bar 25 is now deviated to ride up the upper curved surface 24a of extension 24, whereby the lens barrel is forced to such extreme movement in the direction of the object (see arrow C) that an automatic focusing of the lens relative to the object and the inscription 20a occurs uninterruptedly during the taking of motion pictures, so that a motion picture film thereafter projected will be perceived as a continuous film take without any interruptions while the extreme focus is critically controlled during the advancement of the dolly towards the object 20.

It will be noticed that carriage 30 is equipped with a metering device 60 for determining the distance of the camera lens from the object 20. To this end the device 60 is operatively connected by means of a flexible shaft 61 with the axle 32 of roller 29 by a suitable known coupling 62.

Thus it will be possible to move the camera wagon 10 relative to the object (approaching or retracting) up to a predetermined distance readable on the metering device 60. During such movement the control of the focusing device is first manually carried out and after having reached the predetermined distance, say, five feet, the automatic focusing mechanism 25, 25a, 24a, 50, 37, 38, 41, 51, 52, 53 becomes effective without the need of any further manual adjustment or operation.

Since the metering device 60 is disposed adjacent the hand wheel 45 the focusing scale 47 can be brought into easy visual registry with the value indicated on the aforesaid distance meter device.

Let it be assumed that the motion picture, television or like camera 15 on wagon or dolly 10 is about twenty or more feet from object 20 and the scene surrounding same, then the operator may use in a conventional manner manipulating handle and wheels to direct the camera in regard to the scene and will select manually by means of hand wheel 45 the focus as the particular scene requires it. As soon as the camera wagon during its continuous track-bound movement approaches a distance, say, of five feet from the object 20 (to be read at meter 60), guide bar or rail means 25 will engage at 25a the follower 50, which was prior to said engagement suspended and out-of-contact with said guide bar. From then on, follower 50 contacting said guide bar and its cam extension, will remain in engagement and cooperation therewith, without necessitating any further manual corrective adjustment in regard to the lens focus and any interruption of the recording operation and of the movement of the camera wagon along its track until such close distance to the object is attained (generally approximately two inches), that said wagon may be arrested and the picture take is fully terminated. From the foregoing it will become immediately apparent, that in contradistinction to heretofore known focusing devices in this field, no interruption in the operation in taking extreme close-up pictures is required, as the critical focusing takes place automatically and immediately after release of the manual focusing control so that a positive and more precise control occurs, while the camera continues moving closer to the object.

A stationary close-up picture recording heretofore imperative when photographing at a distance of less than three feet can now be effectively avoided, so that the impression of the film taken of the scene and in accordance with the invention will be considerably different and of great and dramatic impact, as no hiatus or gap in the continuous reproduction of the scene and object therein will occur.

It can thus be seen, that there has been provided according to the invention means for automatically focusing the lens of a motion picture and like camera for recording extreme close-up pictures of an object, whereby the camera is mounted for operation on a wagon arranged for movement along a fixed track; comprising guide rail means provided with a cam extension for said extreme close-up recording, said guide rail means being fixed laterally to and gradually extending above said track and to said cam extension disposed adjacent the end of said track, said cam extension being shaped in conformity with the focusing movements required for said lens to take said extreme close-up pictures, a roller-equipped carriage detachably connected to said wagon and movable with the latter and on the roller in engagement with said track, motion transfer means supported by said carriage, said motion transfer means including lens focusing adjustment means, shaft means joined at one of its ends to said adjustment means, said transfer means being further provided with lever means pivotally journaled on said carriage and operatively connected to said shaft means at another end thereof, a cam follower connected to said lever means and located for engagement and cooperation with said guide rail means and said cam extension, to thereby translate displacements of said follower along said rail means and said cam extension onto said shaft means and thence to said lens focusing adjustment means.

Thus said track-bound carriage during movement of said wagon toward said object causes focusing movements of said lens via said shaft means commensurate with the displacements of said follower relative to said rail means and said cam extension, and means operatively connected to said lens focusing adjustment means and operable independently of said follower displacements at a relatively large distance from said object and before said follower engages said rail means.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. Means for automatically focusing the lens of a motion picture camera for recording extreme close-up pictures, whereby the camera is mounted for operation on a wagon arranged for movement along a fixed track; comprising guide bar means provided with a cam extension for extreme close-up recording, said guide bar means being connected to said track and with said cam extension disposed at the end of said track, said cam extension being constructed to correspond to movements required for focusing said lens within a distance range of about 5 feet to about 2 inches from the object to be photographed during said extreme close-up, a carriage provided with a roller operatively coupled to said wagon and movable with the latter on said track by means of said roller, motion transfer means supported by said carriage, said motion transfer means including lens barrel adjustment means for focusing said lens, a flexible shaft joined at one end thereof to said adjustment means, said transfer means being further provided with first lever means pivotally journaled on said carriage and provided with a cam follower located for engagement with said guide bar means, and second lever means in operative relation with said first lever means and translating movements of said follower along said cam extension onto the other end of said flexible shaft and thence to said lens barrel adjustment means, whereby said carriage is track-bound during movement of said wagon, while focusing of said lens is carried out commensurate with the movements of said follower on said cam extension via both said lever means and said flexible shaft, the latter being adapted to follow said operation of said camera on said wagon.

2. Means for automatically focusing the lens of a motion picture camera for recording extreme close-up pictures, whereby the camera is mounted for swivel and like operations on a wagon arranged for movement along a fixed track; comprising guide bar means provided with a cam extension for said extreme close-up recording, said guide bar means being fixed laterally to and extending above said track and with said cam extension disposed adjacent the end of said track, said cam extension being shaped in conformity with the focusing movements required for said lens within a distance range of about 5 feet to about 2 inches from the object to be recorded during said extreme close-up, a roller-equipped carriage detachably connected to said wagon and movable therewith through the roller on said track, motion transfer means supported by said carriage, said motion transfer means including lens focusing adjustment means, a flexible shaft joined at one end thereof to said adjustment means, said transfer means being further provided with first lever means pivotally journaled on said carriage, a cam follower connected to said first lever means and located for cooperation with said guide bar means and said cam extension, and second lever means in operative relation with said follower and translating displacements of the latter along said cam extension onto the other end of said flexible shaft and thence to said lens focusing adjustment means, whereby said track-bound carriage during movement of said wagon toward said object causes focusing movements of said lens commensurate with the displacements of said follower on said cam extension via said flexible shaft, the latter being adapted to follow said swivel and like operations of said camera relative to said wagon.

3. Means for automatically focusing the lens of a motion picture camera for recording extreme close-up pictures of an object, whereby the camera is mounted for operation on a wagon arranged for movement along a fixed track; comprising guide bar means provided with a cam extension for said extreme close-up recording, said guide bar means being fixed laterally to and gradually extending above said track and to said cam extension disposed adjacent the end of said track, said cam extension being shaped in conformity with the focusing movements required for said lens to take said extreme close-up pictures, a roller-equipped carriage detachably connected to said wagon and movable with the latter and on the roller in engagement with said track, motion transfer means supported by said carriage, said motion transfer means including lens focusing adjustment means, shaft means joined at one of its ends to said adjustment means, said transfer means being further provided with lever means pivotally journaled on said carriage and operatively connected to said shaft means at another end thereof, a cam follower connected to said lever means and located for engagement and cooperation with said guide bar means and said cam extension, to thereby translate displacements of said follower along said rail means and said cam extension onto said shaft means and thence to said lens focusing adjustment means, whereby said trackbound carriage during movement of said wagon toward said object causes focusing movements of said lens via said shaft means commensurate with the displacements of said follower relative to said bar means and said cam extension, a hand wheel, and means operatively connecting said lens focusing adjustment means with said hand wheel and operable independently of said follower displacements at a relatively large distance from said object and before said follower engages said bar means.

4. The combination, in a wagon arranged for movement along a fixed track and equipped with a motion picture camera adapted to record extreme close-up pictures of an object, of guide bar means including a cam extension, with a cam follower located for engagement and cooperation with said guide bar means and said cam extension, to thereby facilitate automatic focusing of the lens of the camera for said extreme close-up recording, said guide bar means being connected to and extending above said track a predetermined distance from said object, said cam extension being disposed adjacent the end of said track and being shaped in conformity with the focusing movements required for said lens to take said extreme close-up pictures, a roller-equipped carriage detachably connected to said wagon and movable together with the latter on the roller in engagement with said track, motion transfer means supported by said carriage and including lens focusing adjustment means, shaft means joined at one of the ends thereof to said adjustment means, and lever means pivotally journaled on said carriage and operatively connected to the other end of said shaft means, the displacements of said follower along said bar means and said cam extension being translated via said lever means onto said shaft means and thence to said lens focusing adjustment means, whereby said trackbound carriage during movement toward said object causes focusing movements of said lens via said shaft means commensurate with the displacement of said follower relative to said bar means and said cam extension, said follower being operatively connected to said lever means.

5. The combination according to claim 4, including manually operable means operatively connected to said shaft means and said lens focusing adjustment means, whereby lens focusing may be had along a portion of said track devoid of said guide bar means and said cam extension.

6. The combination according to claim 5, including metering means supported by said carriage and operatively connected to the roller thereof whereby movements of said roller will be translated onto said metering device, said manually operable means being supported by said carriage adjacent said metering device.

7. The combination according to claim 5, said manually operable means including a hand wheel, gear means in operative relation with said hand wheel and said shaft means to rotate the latter, said lens focusing adjustment means including a pinion and a rack, said rack being connected with means supporting said lens, whereby rotation of said hand wheel is translated through said gear means and said shaft means to said pinion and rack connection for focusing said lens.

8. The combination, in a wagon arranged for movement along a fixed track and equipped with image recording apparatus adapted to record extreme close-up images of an object, of guide bar means including a cam extension, with a cam follower located for engagement and cooperation with said guide bar means and said cam extension, to thereby facilitate automatic focusing of the lens of the recording apparatus for said extreme close-up recording, said guide bar means extending substantially parallel to and above said track and with said cam extension disposed a predetermined distance from said object, said cam extension being shaped in conformity with the focusing movements required for said lens to take said extreme close-up images, support means connected to said wagon and movable together with the latter lengthwise of said track, motion transfer means mounted on said support means and including lens focusing adjustment means, flexible shaft means joined at one of the ends thereof to said adjustment means, and lever means operatively connected to the other end of said shaft means, said follower being connected to said lever means and displaceable relative to and above said track along said bar means and said cam extension, displacements of said follower being translated via said lever means onto said shaft means and thence to said lens focusing adjustment means, whereby during movement of said trackbound wagon toward said object focusing movements of said lens via said shaft means may be had commensurate with displacements of said follower on said guide bar means and said cam extension, said guide bar means and said cam extension being attached to the side of said track and extending substantially perpendicularly to the ground on which said track is mounted.

References Cited in the file of this patent

UNITED STATES PATENTS

| | | |
|---|---|---|
| 1,387,457 | De Bouzek | Aug. 16, 1921 |
| 1,641,346 | Meder | Sept. 6, 1927 |
| 2,208,403 | Winchester | July 16, 1940 |
| 2,383,161 | Pratt | Aug. 21, 1945 |

FOREIGN PATENTS

| | | |
|---|---|---|
| 553,017 | Germany | June 24, 1932 |